United States Patent
Shanmugham

Patent Number: 5,821,469
Date of Patent: Oct. 13, 1998

[54] DEVICE FOR SECURING CABLES IN A TELECOMMUNICATIONS SYSTEM

[75] Inventor: Varudiyam P. Shanmugham, Hanover Park, Ill.

[73] Assignee: Lucent Technologies Inc., Murray Hill, N.J.

[21] Appl. No.: 768,824

[22] Filed: Dec. 18, 1996

[51] Int. Cl.$^6$ ...................................................... H01B 17/26
[52] U.S. Cl. ............................................ 174/135; 174/154
[58] Field of Search ................................. 174/135, 154, 174/158 F, 161 F, 44, 40 C

[56] References Cited

U.S. PATENT DOCUMENTS

| | | | |
|---|---|---|---|
| 2,499,709 | 3/1950 | Whitman et al. | 174/44 |
| 4,244,638 | 1/1981 | Little et al. | 339/103 M |
| 5,159,156 | 10/1992 | Munk et al. | 174/50 |

FOREIGN PATENT DOCUMENTS 1 087 652  8/1960  Germany .................. H02G 19/06

Primary Examiner—Kristine L. Kincaid
Assistant Examiner—Joseph Waks
Attorney, Agent, or Firm—Mony R. Ghose

[57] ABSTRACT

A device for securing a telecommunications cable includes a mid-section and side sections extending from the mid-section for receiving a telecommunications cable. During installation, a "base" cable securing device is positioned on a telecommunications cable and adheres to a stationary object. A "grow" cable securing device surrounds a portion of a second telecommunications cable and is positioned to interlock with the base device to form a stable bundle of telecommunications cables.

9 Claims, 3 Drawing Sheets

5,821,469

DEVICE FOR SECURING CABLES IN A TELECOMMUNICATIONS SYSTEM

TECHNICAL FIELD

This invention relates to efficiently securing cables such as those deployed in telecommunications networks.

BACKGROUND OF THE INVENTION

Establishing telecommunications links between customer premises equipment and telecommunications systems maintained by a service provider often requires great lengths of cable. Indeed, technicians responsible for the implementation of telecommunications service regularly handle awkwardly long lengths of cable which must be secured to a main distributing frame so as not to obstruct telecommunications equipment while remaining easily accessible for repair.

To secure a large number of telecommunications cables, it is common for technicians to gather and "sew" the cables together into a bundle using nylon rope and a device conceptually similar to a sewing needle. The nylon rope is normally arranged into a knot using a "Chicago stitch" or a "lock stitch". Unfortunately, the bundling/sewing process is time consuming and tedious for technicians who must quickly secure many bundles of cables before performing other tasks. Therefore, there is a need in the art for a mechanism that efficiently secures cables in a telecommunications system.

SUMMARY OF THE INVENTION

This need is addressed and a technological advance is achieved in the telecommunications art by a cable securing device in accordance with the present invention for securing a plurality of telecommunications cables.

In the preferred embodiment, a base clip including extended side sections for gripping a surface of telecommunications equipment has serrated edges on outer surfaces for interlocking with other clips. A "grow" clip comprising serrated edges on inner surfaces interlocks with the serrated edges of other clips. Each base clip and the grow clip receives at least one telecommunications cable. To facilitate the maneuverability of telecommunications cables, the top surface of each type of clip is grooved to form a roll surface. Advantageously, the preferred embodiment allows a technician to secure a plurality of telecommunications cables without the need for forming complicated knots.

DETAILED DESCRIPTION

Figure 1:
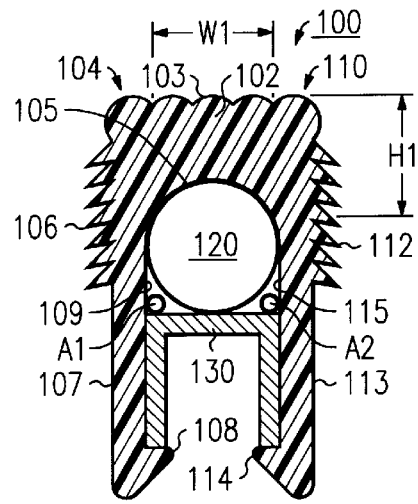
FIG. 1 is a cross-sectional view of the preferred embodiment of a base clip.

FIG. 1 is a cross-sectional view of U-shaped base clip 100, telecommunications cable 120 and track 130. As known in the art, telecommunications cables extend from portions of telecommunications equipment and often rest adjacent to a ladder-type device comprising a plurality of rungs or "tracks". In this embodiment, telecommunications cable 120 is shown abutting track 130.

U-shaped base clip 100 is formed from a resilient material and comprises mid-section 102 and side sections 104 and 110 extending therefrom. Mid-section 102 has a width and height defined by distances W1 and H1, respectively. Mid-section 102 also includes grooved top surface 103 (also known as a "roll" surface) for allowing telecommunications cables to easily slide across the surface. More particularly, top surface 103 allows telecommunications cables resting thereon to be easily manipulated in a lateral or longitudinal direction, and also serves as an ergonomically correct surface for receiving pressure from a technician's fingers. Inner surface 105 is preferably curved to receive at least one cylindrical telecommunications cable, such as telecommunications cable 120. In the preferred embodiment, the dimensions of telecommunications cable 120 allow for a tight fit within the space defined by inner surfaces 105 but not so large as to interfere with the locking of base clip 100 onto track 130. Alternative embodiments may employ abutments A1 and A2 for providing the proper tension to adhere the clip onto track 130 for smaller cables. In other words, abutments A1 and A2 lessen the rigidity of telecommunications cable diameter requirements.

First side section 104 extends from a first end of mid-section 102. First side section 104 includes downwardly disposed serrated edge 106 on its outer surface 107. In the preferred embodiment, first side section 104 also includes resilient distal flange 108 for conforming to a stationary element of telecommunications equipment, such as track 130. Inner surface 109 of first side section 104 is adjacent to telecommunications cable 120 and track 130. Also shown is second side section 110 extending from a second side of mid-section 102. Side section 110 includes downwardly disposed serrated edge 112 on its outer surface 113 and resilient distal flange 114 for conforming to track 130. Inner surface 115 is adjacent to telecommunications cable 120 and track 130.

During installation, a technician manipulates base clip 100 so that inner surface 105 surrounds a portion of a telecommunications cable and distal flanges 108, 114 conform to a stationary portion of telecommunications equipment. In this embodiment, base clip 100 is positioned on telecommunications cable 120 and distal flanges 108, 114 snap- lock around track 130 of a piece of telecommunications equipment (not shown). Although the dimensions of the base clip may vary according to need, in the preferred embodiment, base clip 100 has a height of approximately 3" and a width of approximately 1.5". The dimensions of top surface 103 are approximately 1.5"×1.5".

Figure 2:
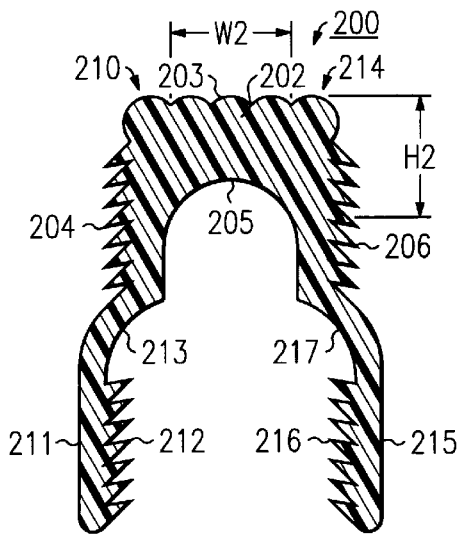
FIG. 2 is a cross-sectional view of the preferred embodiment of a grow clip.

FIG. 2 is a cross sectional view of U-shaped grow clip 200. In the preferred embodiment, grow clip 200 may be used in conjunction with base clip 100. U-shaped grow clip 200 is made from resilient material and comprises mid-section 202 defined by width W2 and height H2. Mid-section 202 includes grooved top (roll) surface 203 and curved inner surface 205 for receiving a telecommunications cable. Grow clip 200 also includes first side section 210 extending from mid-section 202. First side section 210 includes downwardly disposed outer serrated edge 204, smooth outer surface 211 and upwardly disposed inner serrated edge 212 on inner surface 213. Similarly, second side section 214 extends from a second side of mid-section 202 and includes downwardly disposed outer serrated edge 206, smooth outer surface 215 and upwardly disposed inner serrated edge 216 on inner surface 217. Outer serrated edges 204 and 206 are designed to interlock with the upwardly disposed serrated edges of another clip, as described below. In the preferred embodiment, inner serrated edges 212 and 216 are dimensioned to interlock with downwardly disposed outer serrated edges on a base clip or another grow clip. In alternative embodiments, upwardly disposed inner serrated edges 212 and 216 may interlock with downwardly disposed serrated edges located on other objects, such as a downwardly disposed serrated track. Preferably, a grow clip has the same dimensions as a base clip.

Figure 3:
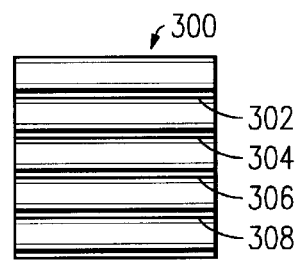
FIG. 3 is a top view of the preferred embodiment of a base clip or a grow clip.

FIG. 3 shows a top view of the top (roll) surface of a base (grow) clip. In this example, FIG. 3 represents top surfaces 103 and 203 of base clip 100 and grow clip 200, respectively. In the preferred embodiment, top surface 300 comprises a plurality of grooves 302, 304, 306 and 308 which form roll ridges. In the preferred embodiment, telecommunications cables rest on the top surface of cable securing clips. A grooved top surface enables easy longitudinal movement and maneuverability of cables by allowing them to move laterally (i.e., roll) across the ridges when the cable is not secured.

Figure 4:
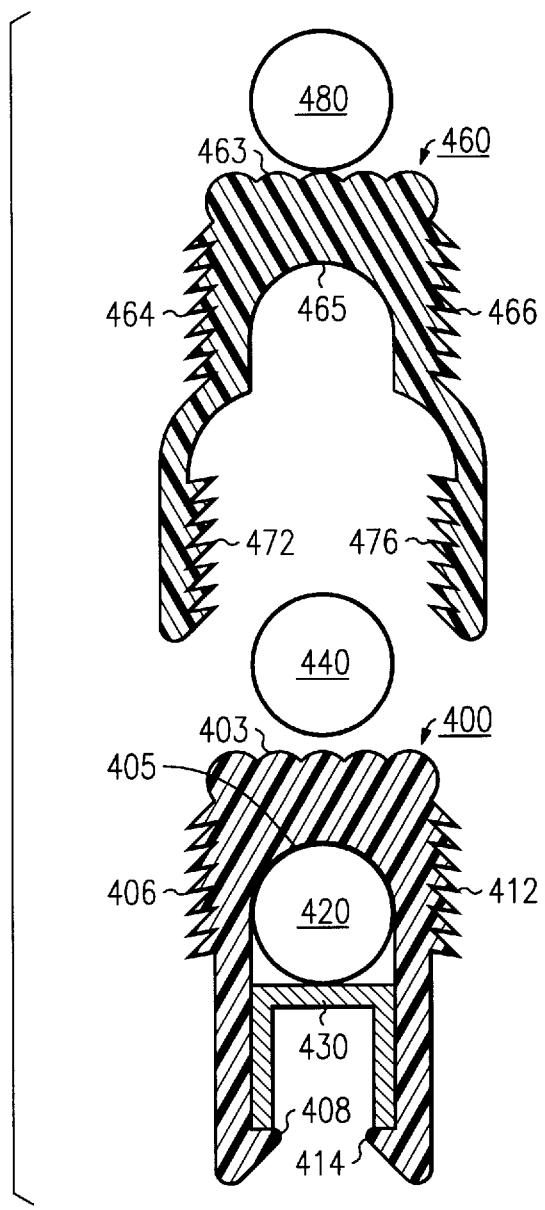
FIG. 4 is a cross-sectional view of a base clip and grow clip securing a plurality of telecommunications cables.

FIG. 4 shows a cross-sectional view of a base clip and grow clip securing a plurality of telecommunications cables. More particularly, U-shaped base clip 400 is shown attached to track 430 of a piece of telecommunications equipment to stabilize telecommunications cable 420. In this embodiment, assume that telecommunications cable 420 has dimensions such that abutments are unnecessary. Base clip 400 is equipped with distal flanges 408 and 414 for securely conforming to a surface of track 430. Telecommunications cable 420 fits snugly adjacent the curved inner surface 405 of base clip 400. Outer serrated edges 406 and 412 interlock with the inner serrated edge of grow clip 460, as described below. Top surface 403 is grooved to allow easy maneuverability of a telecommunications cable which rests thereon.

U-shaped grow clip 460 is shown positioned above telecommunications cable 440 resting on grooved surface 403 of base clip 400. During actual implementation, grow clip 460 surrounds a portion of telecommunications cable 440 so that it is flush with curved inner surface 465 of the clip. Inner serrated edges 472 and 476 ratch along and finally interlock with outer serrated edges 406 and 412 of base clip 400, respectively. In this manner, base clip 400 is adhered securely to stationary track 430 of the telecommunications equipment, and grow clip 460 is securely adhered to base clip 400. Telecommunications cables 420 and 440 are held in place by the base clip and the grow clip, respectively. Outer serrated edges 464 and 466 of grow clip 460 are used for interlocking with another grow clip (not shown) which may be used to secure telecommunications cable 480 shown resting on top surface 463 of grow clip 460. As installed, a plurality of interlocking grow clips form a uniform outer surface.

Figure 5:
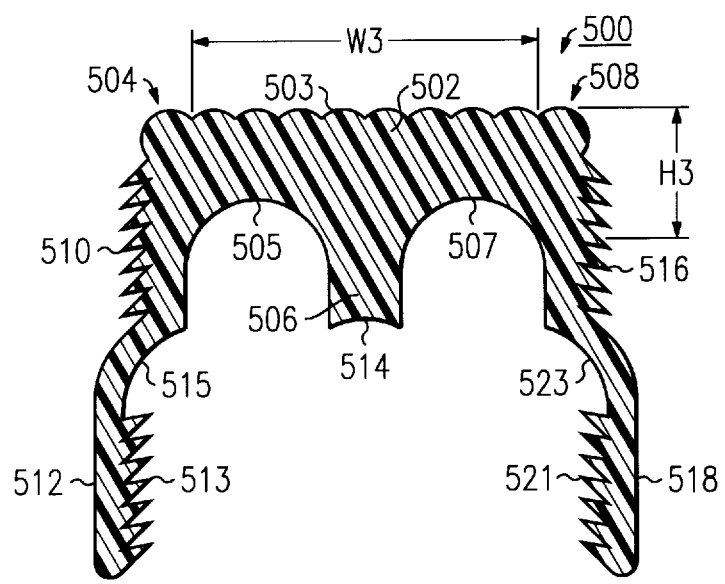
FIG. 5 is cross-sectional view of another preferred embodiment of a grow clip for accommodating multiple telecommunications cables.

FIG. 5 shows another preferred embodiment of a grow clip. More particularly, U-shaped grow clip 500 accommodates multiple telecommunications cables and may be used with a base clip which also accommodates multiple cables. Grow clip 500 comprises mid-section 502, first side section 504, extension 506 and second side section 508. Mid-section 502 has dimensions of width W3 and height H3. Mid-section 502 also comprises a top surface 503 including roll ridges, first curved inner surface 505 and second curved inner surface 507.

First side section 504 extends from a first end of mid-section 502 and comprises downwardly disposed outer serrated edge 510 and smooth inner surface 512. Upwardly disposed inner serrated edge 513 is located on inner surface 515 of first side section 504.

Extension 506 extends from the center of mid-section 502 and includes curved surface 514 for receiving at least one ridge on a top surface of a base clip or a grow clip. Second side section 508 extends from a second end of mid-section 502 and comprises downwardly disposed outer serrated edge 516 and smooth outer surface 518. Second side section 508 also includes upwardly disposed inner serrated edge 521 on smooth inner surface 523.

As installed, grow clip 500 receives two telecommunications cables which fit snugly adjacent inner surfaces 505 and 507. Upwardly disposed inner serrated edges 513 and 521 interlock with downwardly disposed serrated edges of another clip. Preferably, grow clip 500 has a height of approximately 3" and a width of approximately 1.5". The dimensions of top surface 503 are 3"×1.5". In alternative embodiments, grow clips can vary in size to accommodate any number of telecommunications cables.

Advantageously, the preferred embodiments of the present invention allow a technician to secure a plurality of telecommunications cables by simply snapping a base clip and a of grow clip into place over cables. The need to secure a plurality of telecommunications cables by tediously sewing complex knots is eliminated. Although the present invention has been described with preferred embodiments, those skilled in the art may devise numerous other arrangements without departing from the scope of the invention as defined in the following claims.

The invention claimed is:

1. A cable securing device comprises a mid-section including a curved portion for receiving at least one telecommunications cable;

a first side section extending from the mid-section, the first side section including at least one serrated edge;

a second side section extending from the mid-section, the second side section including at least one second serrated edge; and a cable tension providing abutment located on said first side section and said second side section.

2. The cable securing device of claim 1 further comprising a plurality of roll ridges on a top surface of the mid-section.

3. The cable securing device of claim 1 wherein the at least one serrated edge and the at least one second serrated edge interlocks with serrated edges of an another cable securing device.

4. A telecommunications cable securing device comprises:

a mid-section including a curved inner surface for receiving at least one telecommunications cable;

a first side section extending a first side of the mid-section, the first side section including a first cable tension providing abutment; and a second side section extending from a second side of the mid-section, the second side section including a second cable tension providing abutment.

5. The telecommunications cable securing device of claim 4 further comprising the first side section and the second side section interlocking with at least one other telecommunications cable securing device.

6. The telecommunications cable securing device of claim 4 further comprising means for adhering to a stationary object.

7. A method for securing a plurality of telecommunications cables comprises the steps of:

positioning a first cable securing device, including cable tension providing abutments on a first telecommunications cable;

positioning a second telecommunications cable on the first telecommunications cable; and positioning a second cable securing device on the second telecommunications cable such that the second cable securing device interlocks with the first cable securing device.

8. The method of claim 7 wherein the step of positioning the second cable securing device on the second telecommunications cable comprises the step of:

interlocking a serrated edge of the second cable securing device with a serrated edge of the first cable securing device.

9. The method of claim 7 further comprising the step of adhering the first cable securing device to a stationary object.

* * * * *